United States Patent
Malhotra et al.

(10) Patent No.: US 10,719,774 B2
(45) Date of Patent: Jul. 21, 2020

(54) METHOD AND SYSTEM FOR HEALTH MONITORING AND FAULT SIGNATURE IDENTIFICATION

(71) Applicant: Tata Consultancy Services Limited, Mumbai (IN)

(72) Inventors: Pankaj Malhotra, Noida (IN); Vishnu T V, Noida (IN); Narendhar Gugulothu, Noida (IN); Lovekesh Vig, Gurgaon (IN); Puneet Agarwal, Noida (IN); Gautam Shroff, Gurgaon (IN)

(73) Assignee: Tata Consultancy Services Limited, Mumbai (IN)

( * ) Notice: Subject to any disclaimer, the term of this patent is extended or adjusted under 35 U.S.C. 154(b) by 256 days.

(21) Appl. No.: 15/900,482

(22) Filed: Feb. 20, 2018

(65) Prior Publication Data

US 2019/0057317 A1   Feb. 21, 2019

(30) Foreign Application Priority Data

Aug. 18, 2017   (IN) .............................. 201721029392

(51) Int. Cl.
*G06N 7/00* (2006.01)
*G01M 15/14* (2006.01)
(Continued)

(52) U.S. Cl.
CPC ............ *G06N 7/005* (2013.01); *G01M 15/14* (2013.01); *G05B 23/024* (2013.01);
(Continued)

(58) Field of Classification Search
None
See application file for complete search history.

(56) References Cited

U.S. PATENT DOCUMENTS

| 5,680,409 A | 10/1997 | Qin et al. |
| 2003/0005486 A1* | 1/2003 | Ridolfo .............. G05B 23/0272 800/288 |

(Continued)

FOREIGN PATENT DOCUMENTS

CA   002997489 A1 *   2/2019   ............. G06N 7/005

OTHER PUBLICATIONS

Gregory W. Bartram (System Health Diagnosis and Prognosis Using Dynamic Bayesian Networks, Aug. 2013, 149 pages). (Year: 2013).*

*Primary Examiner* — Tung S Lau
(74) *Attorney, Agent, or Firm* — Finnegan, Henderson, Farabow, Garrett & Dunner LLP

(57) ABSTRACT

This disclosure relates generally to health monitoring of systems, and more particularly to monitor health of a system for fault signature identification. The system estimates Health Index (HI) of the system as time series data. By analyzing data corresponding to the estimated HI, the system identifies one or more time windows in which majority of the estimated HI values are low as a low HI window, and one or more time windows in which majority of the estimated HI values are high as a high HI window. Upon identifying a low HI window, which indicates an abnormal behavior of the system being monitored, based on a local Bayesian Network generated for the system being monitored, an Explainability Index (EI) for each sensor is generated, wherein the EI quantifies contribution of the sensor to the low HI. Further, associated component(s) is identified as contributing to abnormal/faulty behavior of the system.

12 Claims, 18 Drawing Sheets

(51) Int. Cl.
*G06F 11/34* (2006.01)
*G06F 11/07* (2006.01)
*G05B 23/02* (2006.01)

(52) U.S. Cl.
CPC ........ *G06F 11/079* (2013.01); *G06F 11/3409* (2013.01); *G06F 11/3452* (2013.01)

(56) References Cited

U.S. PATENT DOCUMENTS

| | | | |
|---|---|---|---|
| 2012/0101653 A1* | 4/2012 | Tran | G01D 4/004 |
| | | | 700/296 |
| 2012/0215450 A1 | 8/2012 | Ashok et al. | |
| 2016/0143596 A1* | 5/2016 | Bhattacharya | G16H 50/30 |
| | | | 600/301 |

* cited by examiner (Normal Operation)

(Temp-$C_1$ Fault)

(Vibration Fault)

Overall distribution of sensor $T_1$

Overall distribution of sensor $V_1$

Distribution of sensor $V_1$ under low HI condition

METHOD AND SYSTEM FOR HEALTH MONITORING AND FAULT SIGNATURE IDENTIFICATION

PRIORITY CLAIM

This U.S. patent application claims priority under 35 U.S.C. § 119 to: India Application No. 201721029392, filed on 18 Aug. 2017. The entire contents of the aforementioned application are incorporated herein by reference.

TECHNICAL FIELD

This disclosure relates generally to health monitoring of systems, and more particularly to monitor health of a system and to perform fault signature identification.

BACKGROUND

Complex systems deployed in an industry environment need to be monitored to ensure proper working of the system. Such systems would include multiple sub-units of sensors and other components which perform data collection, data processing and so on, and the sub-systems may be communicating each other for data exchange.

It is possible that due to technical issues a sub-system may malfunction, and due to the malfunctioning of the sub-system, readings of corresponding sensors change. In such a connected system, as the throughput of each component/sub-system affects final output of the system, any such malfunction would adversely affect overall throughput of the system.

The inventors here have recognized several technical problems with such conventional systems, as explained below. One way of analyzing issues associated with such complex systems is by performing a manual analysis for verifying working of the system components. However, for systems with the large number of components and complex architecture/design, manual analysis would be a tedious task. Manual analysis further demands complex domain knowledge, and based on amount of knowledge a person has, accuracy of results of verification can also vary.

There are certain methods and systems being used for fault analysis. However, one disadvantage of these systems is that they have limited or no capability of performing a runtime analysis. Furthermore, most of these systems require manual intervention at different stages of the analysis.

SUMMARY

Embodiments of the present disclosure present technological improvements as solutions to one or more of the above-mentioned technical problems recognized by the inventors in conventional systems. For example, in one embodiment, a processor-implemented method for health monitoring and fault signature identification is provided. In this method, for a system being monitored, a Health Index (HI) is generated via one or more hardware processors, by the health monitoring and fault signature identification. By monitoring, the health monitoring and fault signature identification system identifies abnormal behavior of the system, if any, via the one or more hardware processors, wherein an estimated low HI is identified as indicative of the abnormal behavior. The health monitoring and fault signature identification system further detects at least one component of the system as responsible for the abnormal behavior, based on a local Bayesian Network generated for the system.

In another embodiment, a health monitoring and fault signature identification system is provided. The system comprising a processor; and a memory module comprising a plurality of instructions. The plurality of instructions are configured to cause the processor to estimate Health Index (HI) of a system being monitored, via one or more hardware processors, by a HI estimation module of the health monitoring and fault detection system. Further, a low HI data selection module of the health monitoring and fault detection system identifies abnormal behavior of the system, if any, via the one or more hardware processors, wherein an estimated low HI is identified as indicative of the abnormal behavior. Upon identifying the abnormal behavior, a HI descriptor module of the health monitoring and fault detection system detects at least one component of the system as responsible for the abnormal behavior, based on a local Bayesian Network generated for the system, via the one or more hardware processors.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
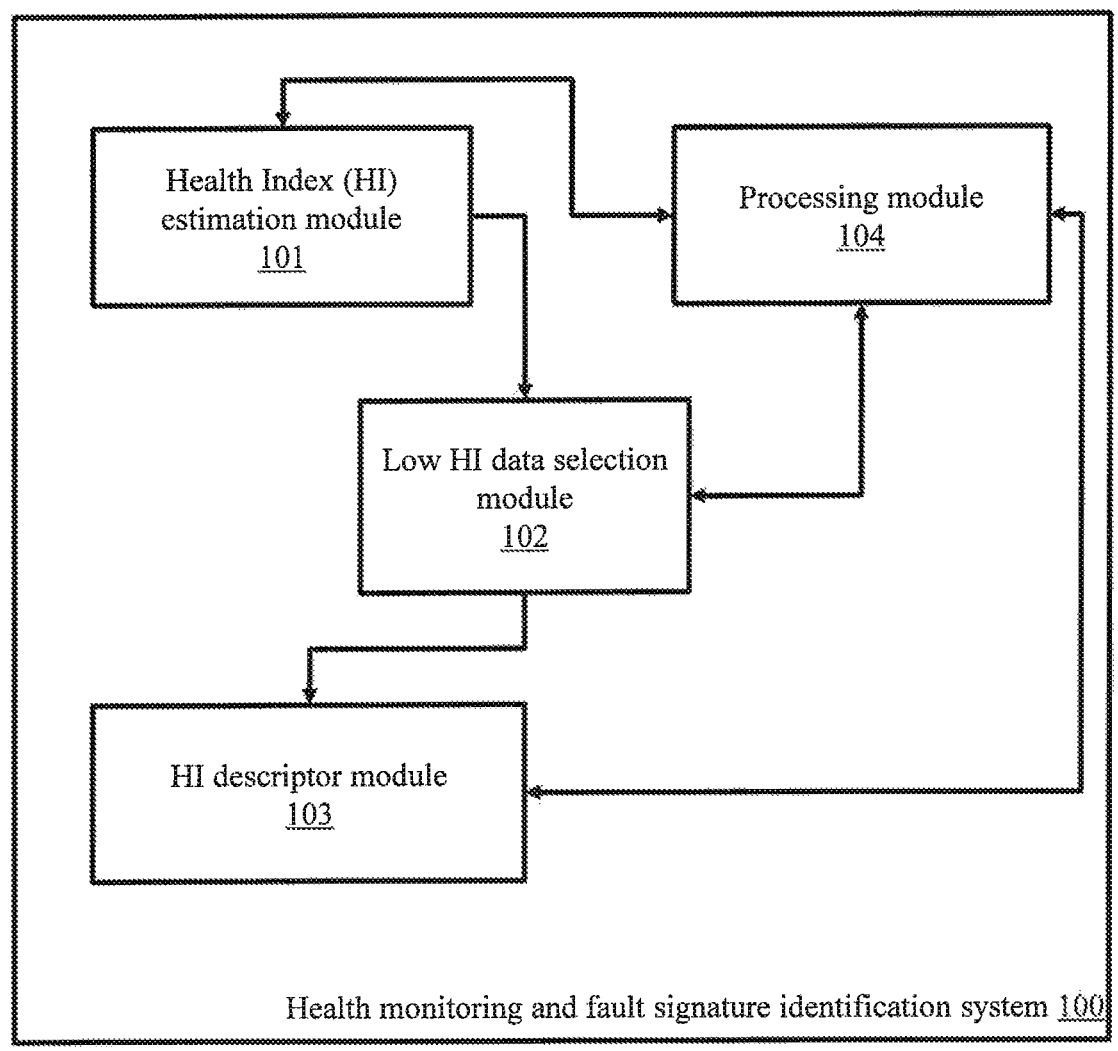
FIG. 1 illustrates an exemplary block diagram of health monitoring and fault signature identification system according to some embodiments of the present disclosure.

FIG. 1 illustrates an exemplary block diagram of health monitoring and fault signature identification system according to some embodiments of the present disclosure. The health monitoring and fault signature identification system 100 includes a Health Index (HI) estimation module 101, a low HI data selection module 102, a HI descriptor module 103, and a processing module 104. When health of a system is to be monitored, the system can be connected with the health monitoring and fault signature identification system 100 using appropriate interfaces such that the health monitoring and fault signature identification system 100 can collect inputs required for the health monitoring as well as for the fault signature identification.

The HI estimation module 101 is configured to collect, using an appropriate input interface, data from one or more components of the system being monitored, as inputs. Here, the term 'component' is used to refer to any hardware module of the system being analyzed which contributes to HI of the system, and which can be monitored for fault signature identification purpose. For example, the component can be a mechanical component, an electrical component, and/or an electronic component, that performs one or more functionalities of the system. Using appropriate sensor(s), one or more data associated with one or more of these components are collected and analyzed by the HI estimation module 101 of the health monitoring and fault signature identification system 100, for the purpose of health monitoring and fault signature identification. The HI estimation module 101 further processes the collected inputs, and estimates HI of the system, wherein the HI of the system represents health status of the system. In an embodiment, the HI is estimated as a time-series data that represents health index of a system for different time intervals. In an embodiment, the HI estimation module 101 estimates the HI of the system, using a Recurring Neural Network (RNN). In this method, the HI estimation module 101 considers a multi-sensor data from the system being monitored, to be multivariate time series $x_i = \{x_i^{(1)}, x_i^{(2)}, \ldots x_i^{(l)}\}$ corresponding to $i^{th}$ instance of a machine, where 'l' is length of time series, and each point $x_i^{(t)} \in R^m$ in the time series is an m-dimension vector with each dimension corresponding to a sensor. A model is trained, based on data from a healthy system, to predict or reconstruct the time series. The HI estimation module 101 assumes that error vectors corresponding to healthy behavior are to follow a normal distribution $\mathbb{N}(\mu, \Sigma)$, wherein the parameters $\mu$ and $\Sigma$ can be obtained using Maximum Likelihood Estimation method over time series in a training set used. Based on $\mu$ and $\Sigma$, the HI is computed as:

$$h_i^{(t)} = \log\left(c \cdot \exp\left(\frac{-1}{2}(e_i^{(t)} - \mu)^T \Sigma^{-1}(e_i^{(t)} - \mu)\right)\right) \quad (1)$$

where $$C = \frac{1}{\sqrt{(2\pi)^d |\Sigma|}}$$

and 'd' is dimension of error vector. The HI estimation module 101 can be further configured to classify machine instance 'i' as healthy or unhealthy class at time 't' if $h_i^{(t)} > r'$, where r' can be a value as configured with the HI estimation module 101.

In an embodiment, the HI estimation module 101 estimates the HI values for specific time intervals i.e. as a time-series data. The HI estimation module 101 further provides the estimated HI data (i.e. data corresponding to the estimated HI) for each time window as an input to the low HI data selection module 102. The low HI data selection module 102 processes the HI data that is in the form of time-series, and identifies data corresponds to low HI of the system if present. In an embodiment, the low HI data selection module 102 identifies low HI of the system in terms of presence of one or more low HI windows in the time-series data being analyzed, where the term 'low HI window' represents a time window in which majority of HI values are less than a threshold value of HI. In an embodiment, the low HI data selection module 102 identifies the threshold value based on HI values obtained in previous time windows. For instance, by analyzing the HI values obtained in all or certain number of previous time windows, can identify range of HI values in the previous time windows, and accordingly determine the threshold value. In another embodiment, the threshold value is configured by a user, as per requirements/implementation standards. In an embodiment, the presence of low HI window(s) is identified as corresponding to or representing an abnormal behavior of one or more components of the system, and of the system as a whole. The detailed working of the low HI selection module 102 is as follows:

By processing the obtained time series data, the low HI selection module 102 classifies time windows in the time series data as low HI window(s) and high HI window(s). One time window can have multiple HI values, wherein the number of HI data in a time window depends on the length of the time window. For example, a time window of length 20 seconds can have 20 HI values (one at each second). Based on HI values in a time window, the low HI data selection module 102 classifies the time window as a low HI window or a high HI window. A low HI window is the time window in which majority of HI values are below the threshold, and high HI window is the time window in which majority of HI values are above the threshold. Upon identifying that one or more of the windows in the obtained time series data are low HI windows, the low HI data selection module 102 invokes the HI descriptor module 103 so as to identify component(s) that is responsible for the abnormal behavior of the system, and provides required inputs to the HI descriptor module 103. In an embodiment, the HI descriptor module 103 is not to be invoked if the HI values indicate a normal functioning of the system.

The HI descriptor module 103, when invoked, identifies all component(s) responsible for the low HI of the system (which is represented by the low HI values in the estimated time series, and in turn by presence of low HI windows). Input to the HI descriptor module 103 is HI values estimated for multiple time windows. In an embodiment, at least two time windows are required for proper functioning of the HI descriptor module 103, wherein one of the two time windows; one time window $\omega_A$ with a majority of low HI values ($h_i^{(t)} \le \tau$) and the other time window $\omega_N$ with a majority of high HI values ($h_i^{(t)} \ge \tau$). The data (HI values) from $\omega_A$ and $\omega_N$ are used to learn parameters that would constitute the local BN, and generate the local BN for the system being monitored and analyzed. The HI descriptor 103 uses Information in the BN for the purpose of mapping an estimated low HI window with one or more components (sensors) of the system. The HI descriptor module 103 then obtains an Explainability Index (EI) for each sensor of the system, based on the local BN and the data collected from the mapped system components, wherein the EI quantifies contribution of each sensor to the estimated low HI value. EI is also represented as $E(S_i)$ in the description. Based on the EI measured for each sensor, the HI descriptor module 103 identifies one or more sensors as carrying faulty signatures that result in the low HI window, and in turn, one or more associated components.

The processing module 104 can be configured to interact with all other components of the health monitoring and fault signature identification system 100, collect instruction and execute one or more steps with respect to function(s) being handled by each module using one or more associated hardware processors.

Figure 2:
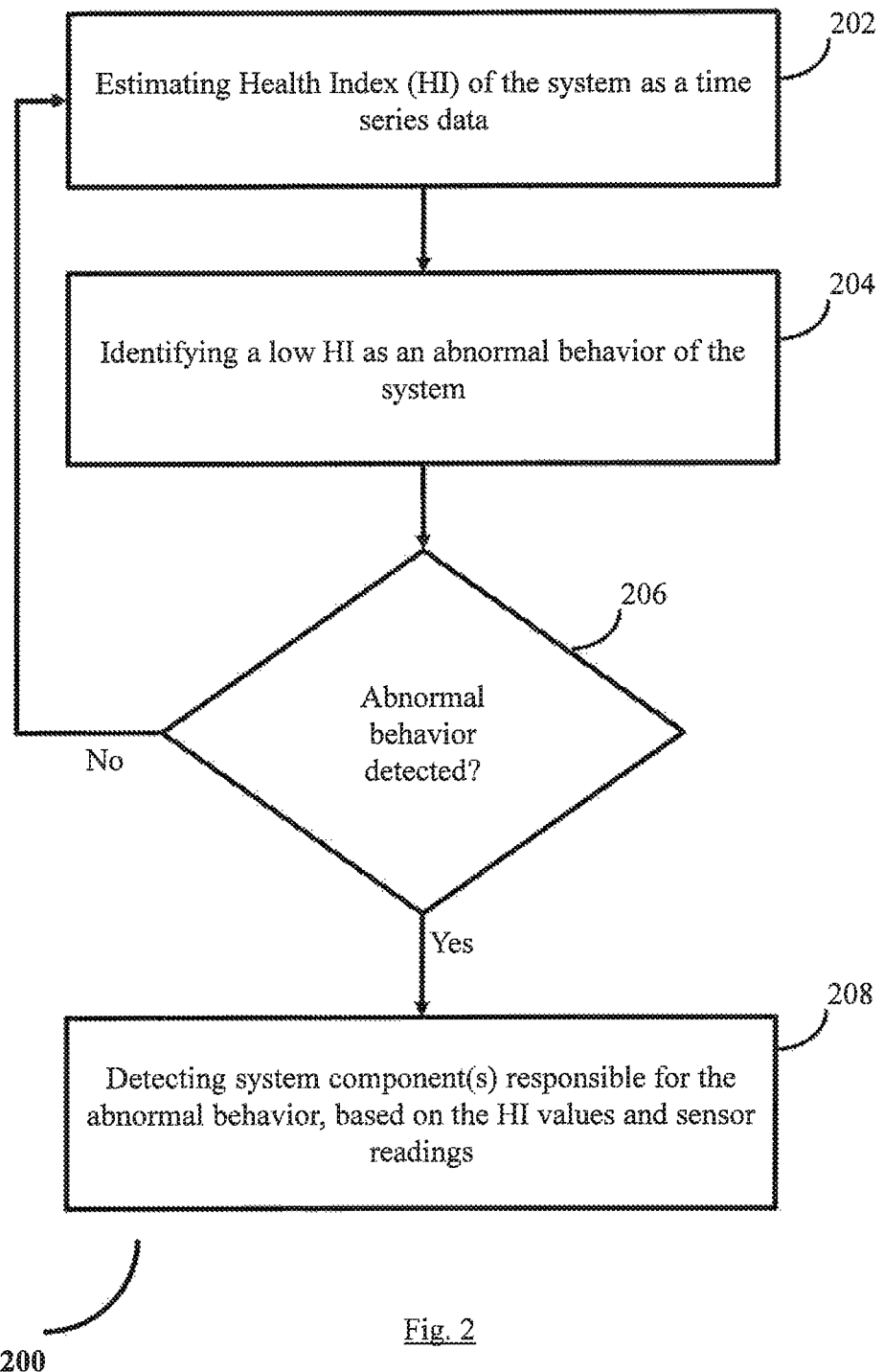
FIG. 2 is a flow diagram depicting steps involved in the process of performing health monitoring of a system, by the health monitoring and fault signature identification system, according to some embodiments of the present disclosure.

FIG. 2 is a flow diagram depicting steps involved in the process of performing health monitoring of a system, by the health monitoring and fault signature identification system, according to some embodiments of the present disclosure. The health monitoring and fault signature identification system 100 while monitoring a system for health assessment, collects real-time information pertaining to various parameters that are directly and/or indirectly associated with health of a system, as inputs. For instance, by using appropriate sensors, data from one or more components of the system being monitored is collected as inputs.

By processing the collected inputs, the health monitoring and fault signature identification system 100 estimates (202) a Health Index (HI) of the system, as a time-series data. The health monitoring and fault signature identification system 100 further identifies, by processing the time-series data, one or more low HI windows (if present) in which majority of the HI values are below a threshold value of HI, which in turn indicates low HI of the system being monitored. The health monitoring and fault signature identification system 100 identifies (204) the low HI as an indicative of abnormal behavior of the system. If an abnormal behavior of the system is detected, then the health monitoring and fault signature identification system 100, based on a local Bayesian Network (BN) generated for the system, detects (208) one or more components of the system as carrying the (faulty) signature(s) for the abnormal behavior of the system. Various actions in FIG. 2 can be performed in the same order or in a different order. Further, or one or more of the actions in method 200 can be omitted.

Figure 3:
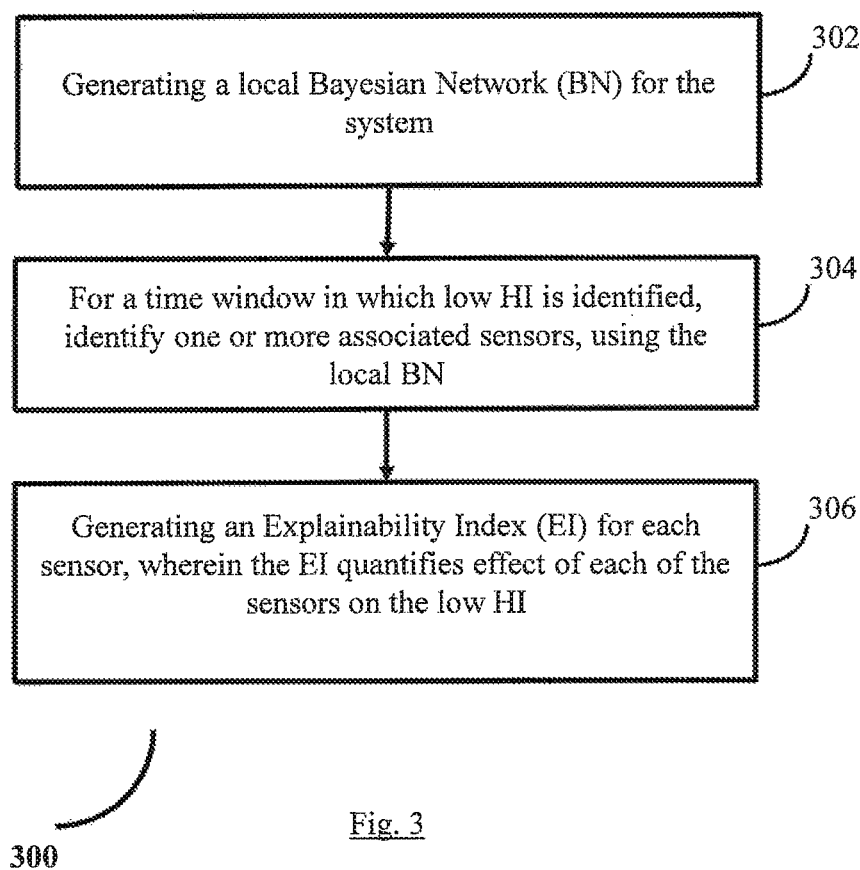
FIG. 3 illustrates a flow diagram depicting steps involved in the process of identifying one or more components responsible for an abnormal behavior of the system, based on faulty signatures, by the health monitoring and fault signature identification system, in accordance with some embodiments of the present disclosure.

FIG. 3 illustrates a flow diagram depicting steps involved in the process of identifying one or more components responsible for a low HI of the system, based on faulty signatures, by the health monitoring and fault signature identification system, in accordance with some embodiments of the present disclosure. In order to identify one or more system components that are responsible for an estimated low HI, the health monitoring and fault signature identification system 100 generates (302) a local Bayesian network for the system being monitored, wherein the BN captures dependencies between estimated HI and signatures from different sensors of the system.

The health monitoring and fault signature identification system 100, based on the data present in the BN, identifies (304) one or more system sensors as associated with the estimated low HI. Now, in order to identify specific component out of the one or more components identified based on the BN, as responsible for the low HI (and in turn the abnormal behavior of the system), the health monitoring and fault signature identification system 100 generates (306) an Explainability Index (EI), wherein the EI quantifies the effect of each sensor on the HI through the change in distribution of the readings a sensor takes over time between predicted high HI and low HI ranges, and in turn identifies one or more corresponding components of the system (i.e. the component with which the sensor that has been identified as contributing to the low HI is associated with) that contribute to the low HI and the abnormal behavior of the system. For example, if EI indicates that a particular sensor is responsible for carrying the faulty signature, then the corresponding component(s) is identified as contributing to the abnormal behavior of the system. Various actions in FIG. 3 can be performed in the same order or in a different order. Further, or one or more of the actions in method 300 can be omitted.

Figure 4:
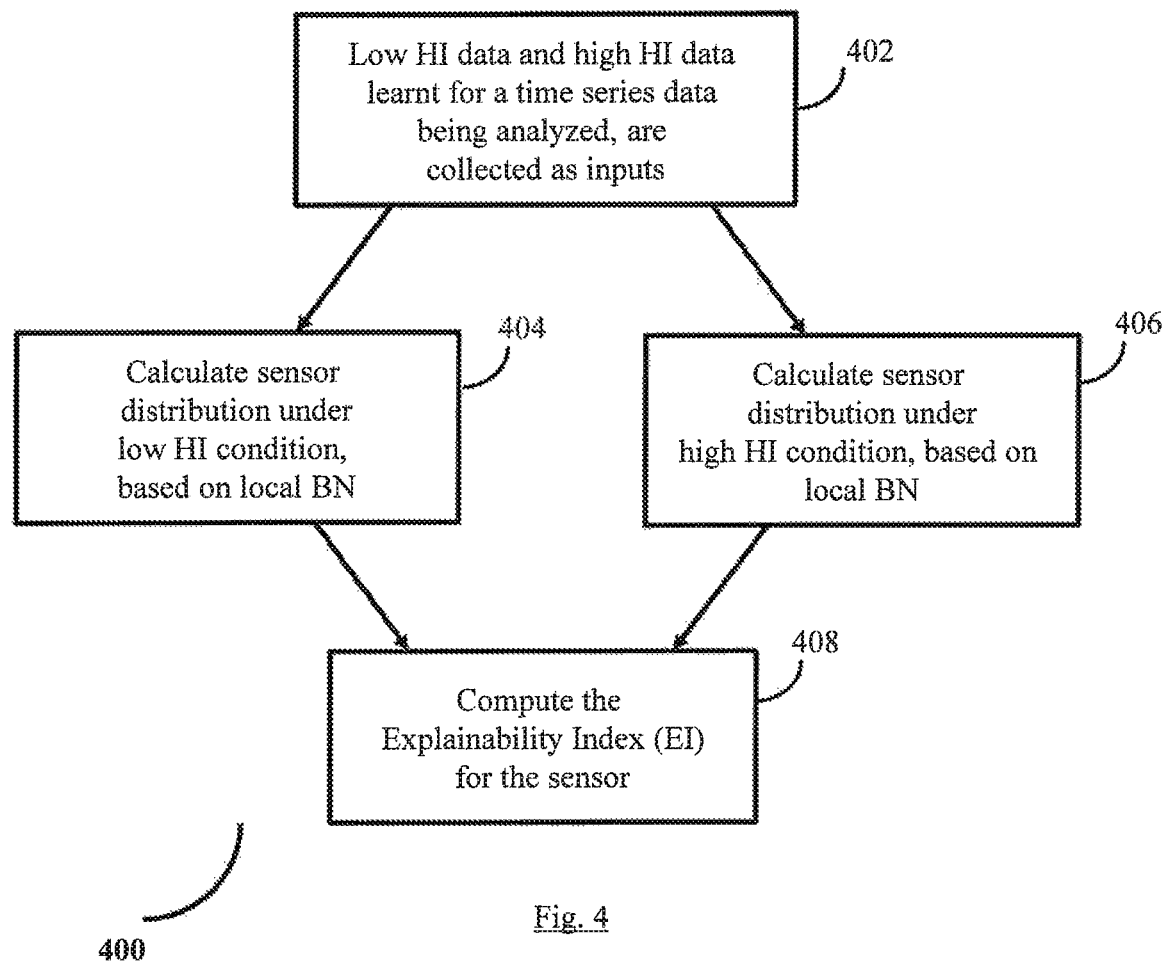
FIG. 4 illustrates a flow diagram depicting steps involved in the process of generating Explainability Index (EI) for a system component, by the health monitoring and fault signature identification system, in accordance with some embodiments of the present disclosure.

FIG. 4 illustrates a flow diagram depicting steps involved in the process of generating Explainability Index (EI) for a sensor, by the health monitoring and fault signature identification system, in accordance with some embodiments of the present disclosure. The EI of a sensor quantifies effect of the sensor on an identified low HI of the system for a HI data (time-series data) being analyzed.

In order to generate the EI for a sensor, the HI descriptor module 103 of the health monitoring and fault signature identification system 100 collects (402) information pertaining to low HI data and high HI data learnt for the time-series data being analyzed, as inputs. The HI descriptor module 103, based on the local BN, calculates (404) sensor distribution under the identified low HI condition, and for the identified high HI condition (406). Further, based on the sensor distribution, the HI descriptor module 103 computes (408) EI for each of the corresponding sensors. The process of computing the EI by the HI descriptor module 103 is explained below:

Consider a discrete random variable H corresponding to HI, and a set of m discrete random variables {$S1, S2, \ldots S_m$} corresponding to 'm' sensors. A BN with m+1 nodes is used to model dependence between the sensors and HI. In an embodiment, for the purpose of modelling dependence between sensors of the system and HI, a joint distribution $P(S1, S2, S_m, H)$ of a set of random variables $X=(S1, S2, S_m, H)$. For a practical scenario practice in which dependence between each sensor and the health index HI is to be modelled, a naive Bayes model with H being the parent node and each Si being a child node can be assumed.

A random variable $X_i \in X$ is considered to have k possible outcomes [$b_i^1, b_i^2, \ldots b_i^k$] corresponding too k discretized bins for the range of values the variable can take. An m-dimensional vector of sensor readings $X^{(t)}$ and health index $h^{(t)}$ for every time instant 't' in windows $\omega_A$ and $\omega_N$ yield one observation for the set of random variables $X=\{S_1, S_2, \ldots S_m, H\}$. A marginal probability distribution for $S_i$ is given as $P(S_i)=[\hat{p}_i^1, \hat{p}_i^2, \ldots \hat{p}_i^k]$, where $\hat{p}_i^j$ is probability of $j^{th}$ outcome of $S_i$. For a given range of values of HI, conditional probability distribution for $S_i$ is given by $P(S_i|H)=[\hat{p}_i^1, \hat{p}_i^2, \ldots \hat{p}_i^k]$. A change in distribution of random variable $S_i$ conditioned on outcomes of H corresponding to high HI ($P(S_i|H_{>r})$) and low HI ($P(S_i|H_{\le r})$) is used to quantify the effect of $i^{th}$ component on HI. Considering $P(S_i|H_{>r})$ and $P(S_i|H_{\leq r})$ as vectors in $R^k$, change is quantified in terms of EI as:

$$E(S_i)=\|P(Si|H_{>r})-P(Si|H_{\leq r})\| \quad (2)$$

where, higher the Explainability index of a sensor, higher is the effect of the sensor on the HI.

EXPERIMENTAL RESULTS

Example 1: On a Turbomachinery Dataset

Consider a turbomachinery dataset containing readings from 58 sensors such as temperature, pressure, and vibration, recorded for 6 months of operation. These sensors capture behavior of different components such as bearing and coolant of the turbomachinery. The turbomachinery is controlled via an automated control system having multiple controls making the sensor readings change frequently, and hence, unpredictable. A Long Short Term Memory-Encoder Decoder (LSTM-ED) is used for HI estimation. A LSTM ED is trained to reconstruct all 58 sensors. Performance details of the HI estimation module 101 and the HI descriptor module 103 are provided on three types of faults, related to: i) abnormal temperature fluctuations in component C1 (Temp-C1), ii) abnormal temperature fluctuations in component C2 (Temp-C2), and iii) abnormal vibration readings.

Stage 1: HI Estimation by HI Estimation Module 101:

TABLE 1

| Dataset | Model | Architecture | precision | Recall | $F_{0.1}$ score |
|---|---|---|---|---|---|
| Engine | Long Short Term Memory - Anomaly Detection (LSTM-AD) | 25 units, 1 layer | 0.94 | 0.12 | 0.89 |
| Turbomachinery | Long Short Term Memory - Encoder Decoder (LSTM-ED) | 500 units, 1 layer | 0.96 | 0.41 | 0.94 |

Figure 6A:
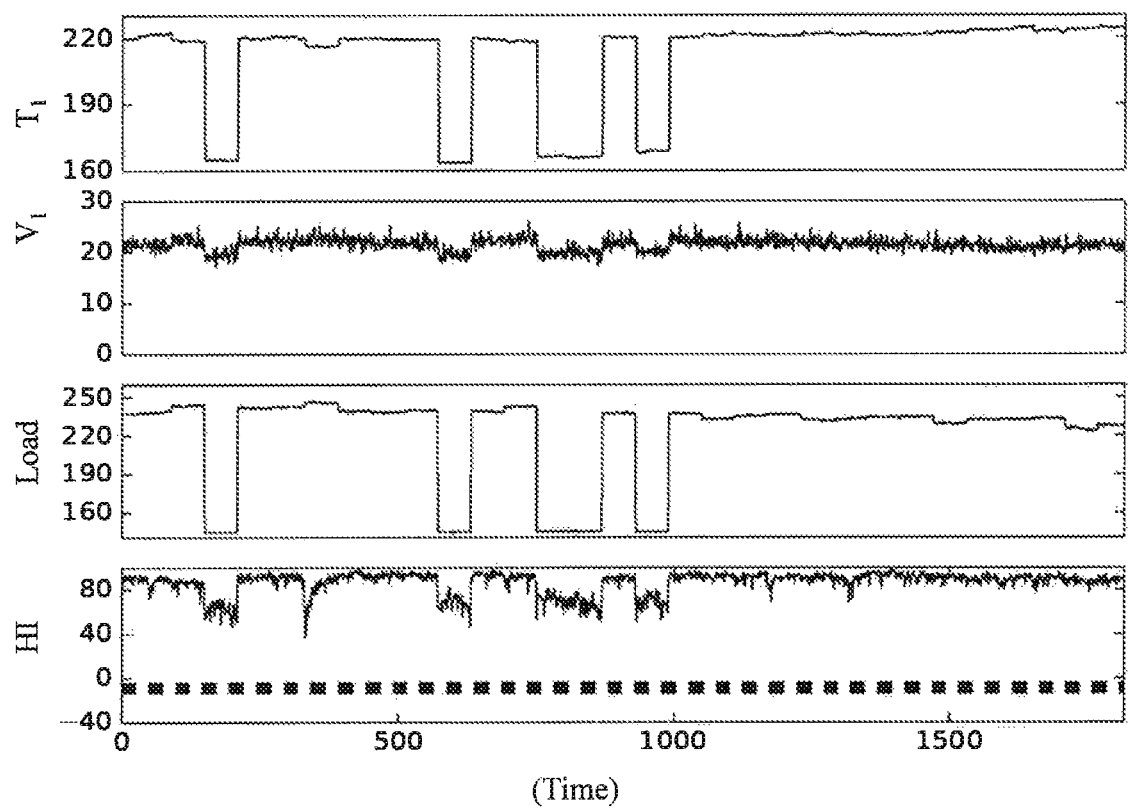
FIGS. 6a through 6c depict sample HI values estimated for a Turbomachinery, in accordance with some embodiments of the present disclosure.
Figure 6B:
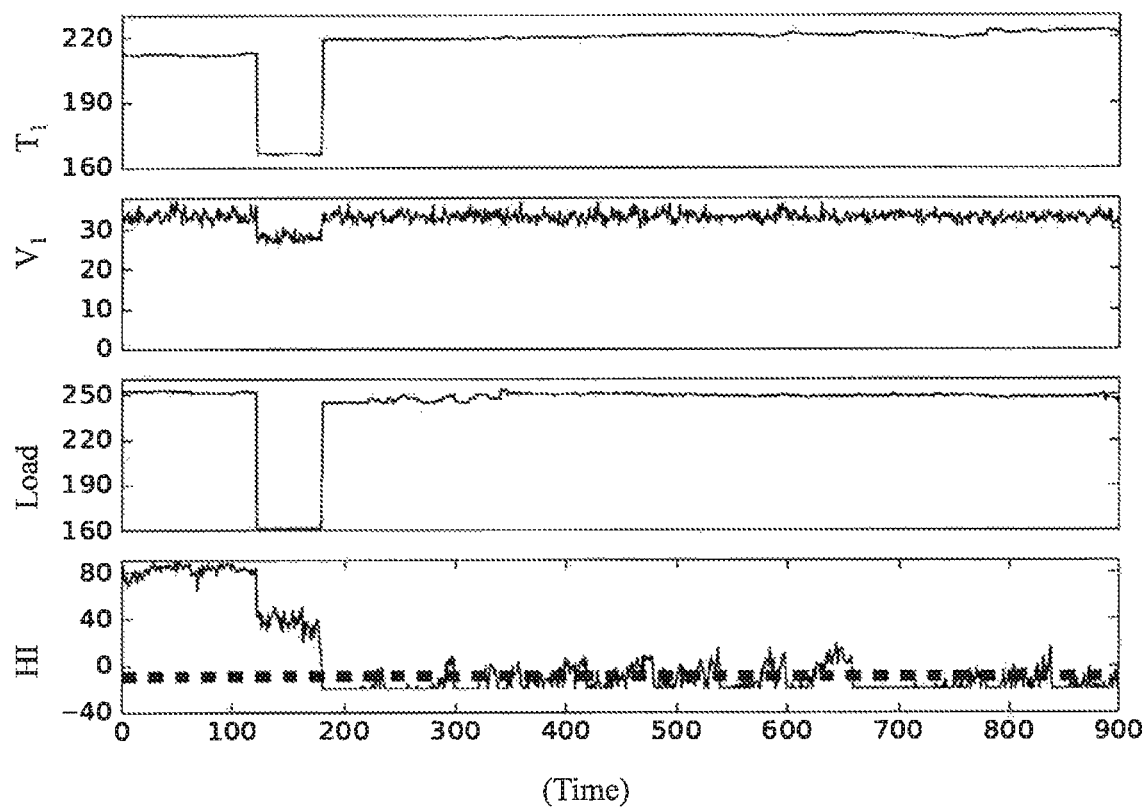
Figure 6C:
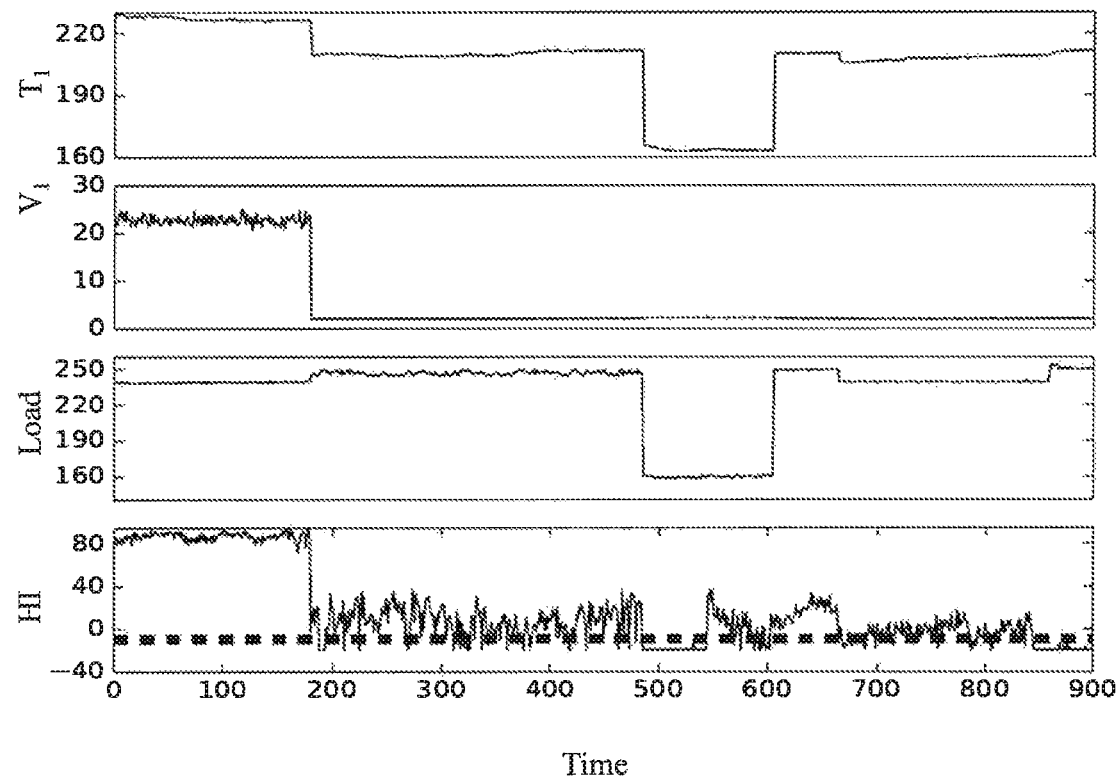

Table 1 shows the performance of HI estimation module 101 for classifying normal and faulty behavior. Most relevant sensor for Temp-C1 and Vibration faults are denoted as T1 and V1, respectively. A plot depicting sample time series for normal and faulty behavior for sensors T1, V1, Load, and HI (as in FIGS. 6a, 6b, and 6c) indicate that while HI is consistently high for normal behavior, it drops below a for faulty behavior (abnormal behavior).

Once HI values are available from LSTM-ED temporal model, a BN is built for the purpose of identifying sensors that carry faulty signature, and in turn the associated component(s) of the system. Examples of BNs built are given in FIG. 5a (turbomachinery data) and FIG. 5b (Engine data).

Stage 2: HI Descriptor Module Operation:

TABLE 2

| Fault Type | Number of instances | Explained instances | Average Rank |
|---|---|---|---|
| Temp-$C_1$ | 3 | 3 | 1.0 |
| Temp-$C_2$ | 1 | 1 | 1.0 |
| Vibration | 6 | 3 | 3.0 |
| Total | 10 | 7 | 2.2 |

Figure 5A:
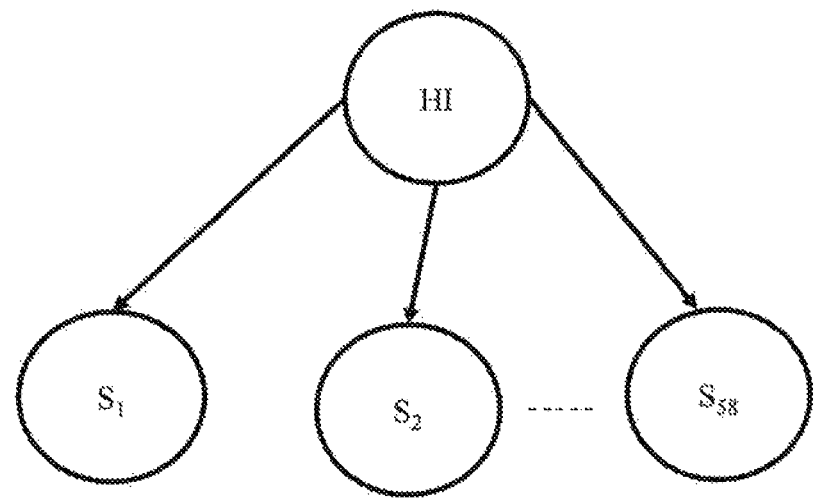
FIGS. 5a and 5b depict Bayesian Networks (BN) generated in an example use-case scenario, in accordance with some embodiments of the present disclosure.
Figure 7A:
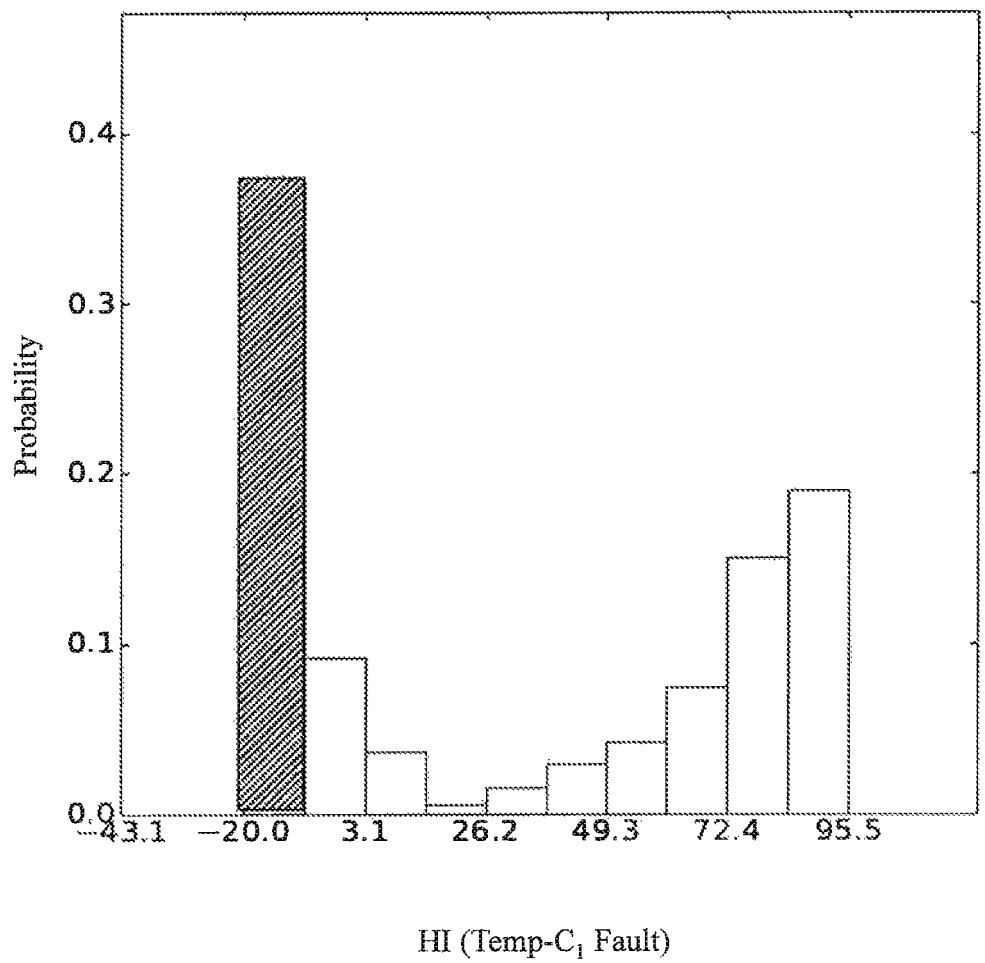
FIGS. 7a through 7h depict sample distributions of sensors which change significantly across the normal and abnormal operations of the system, in accordance with some embodiments of the present disclosure.
Figure 7B:
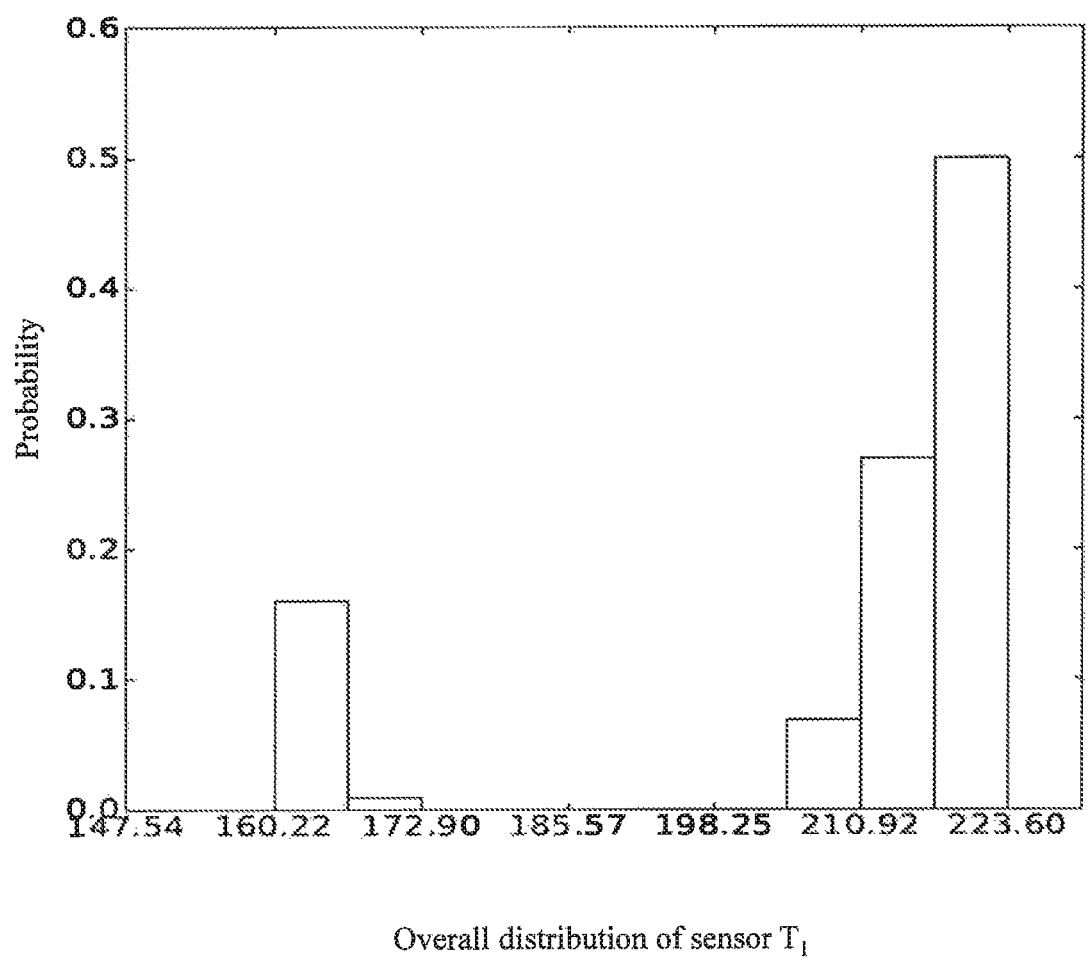
Figure 7C:
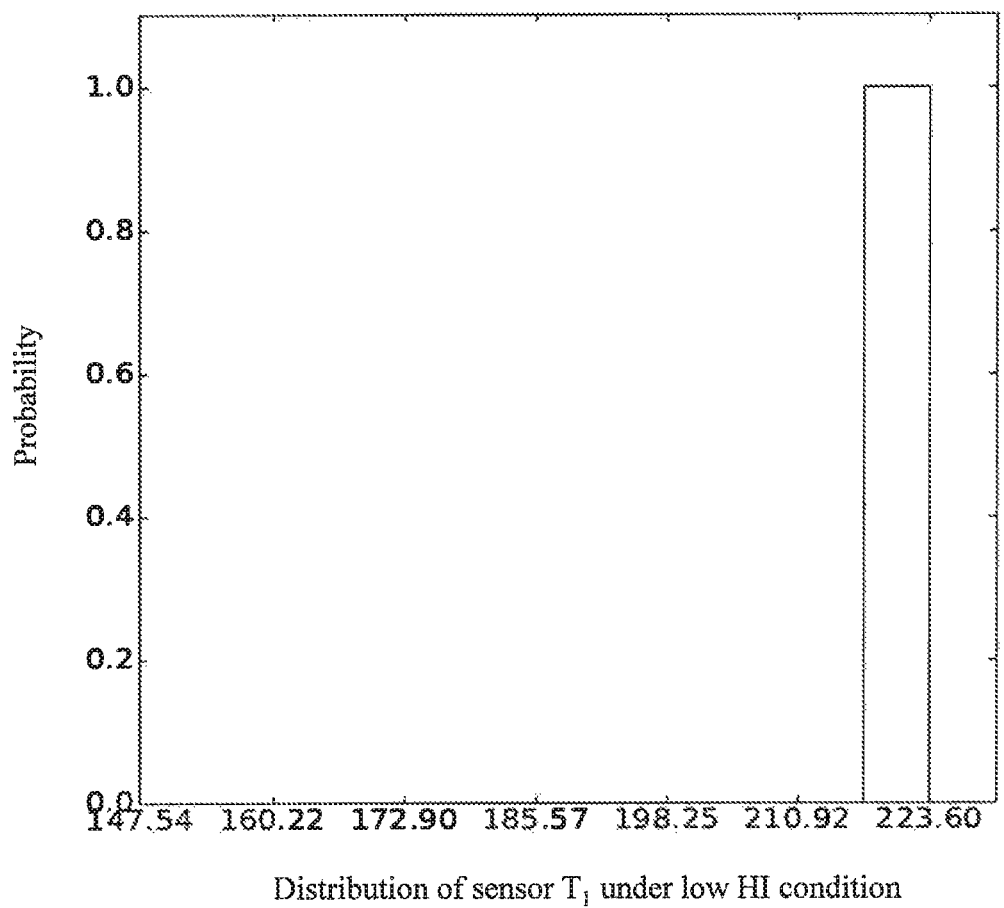
Figure 7D:
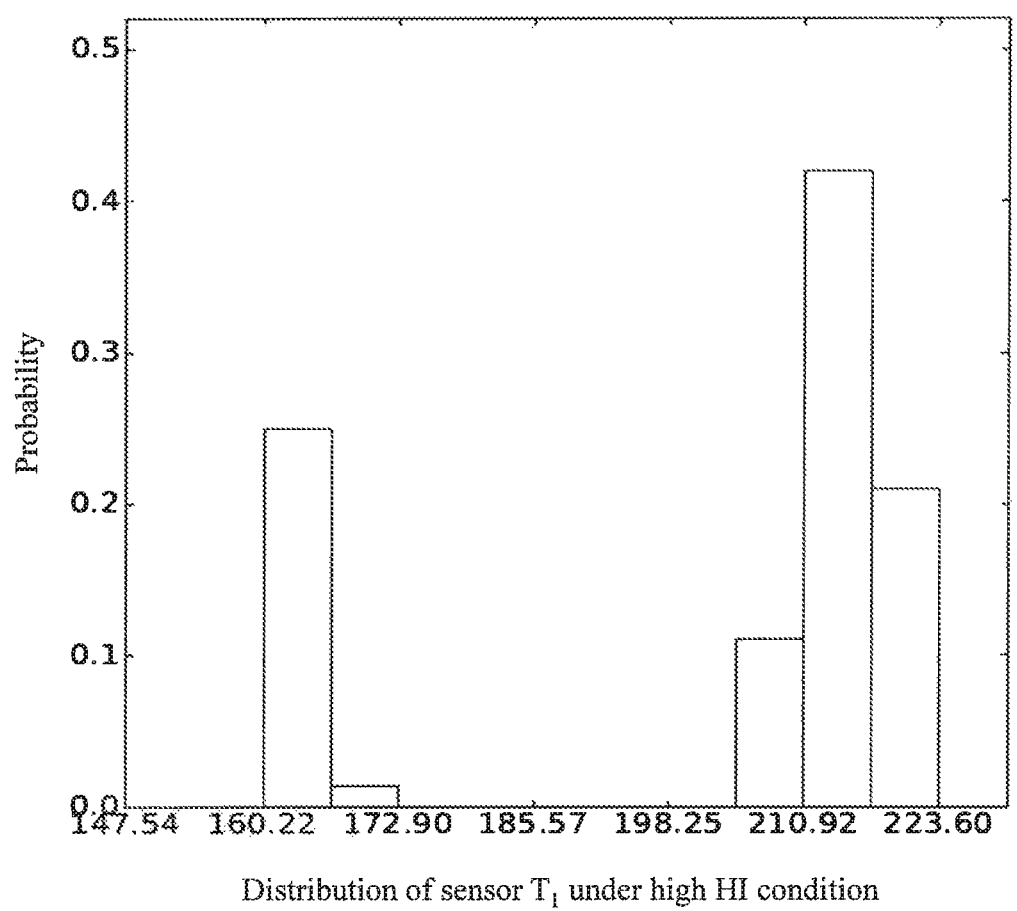
Figure 7E:
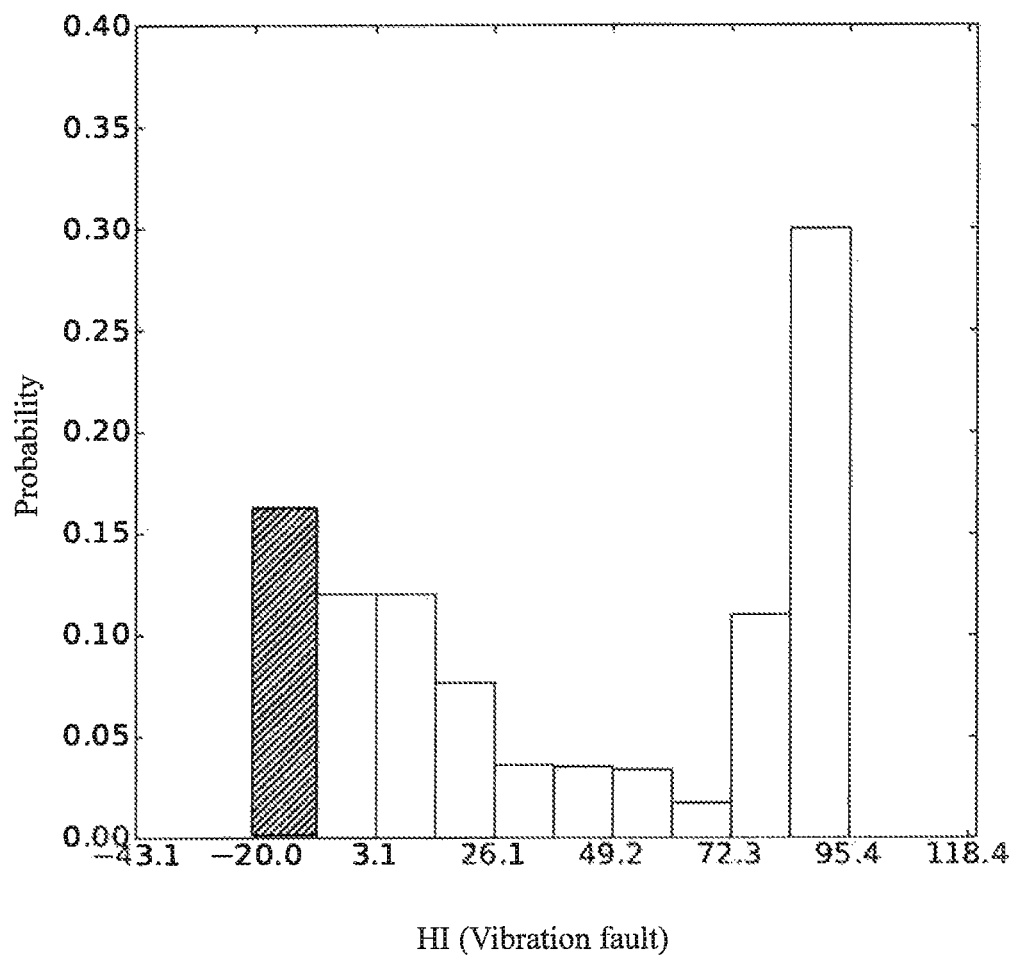
Figure 7F:
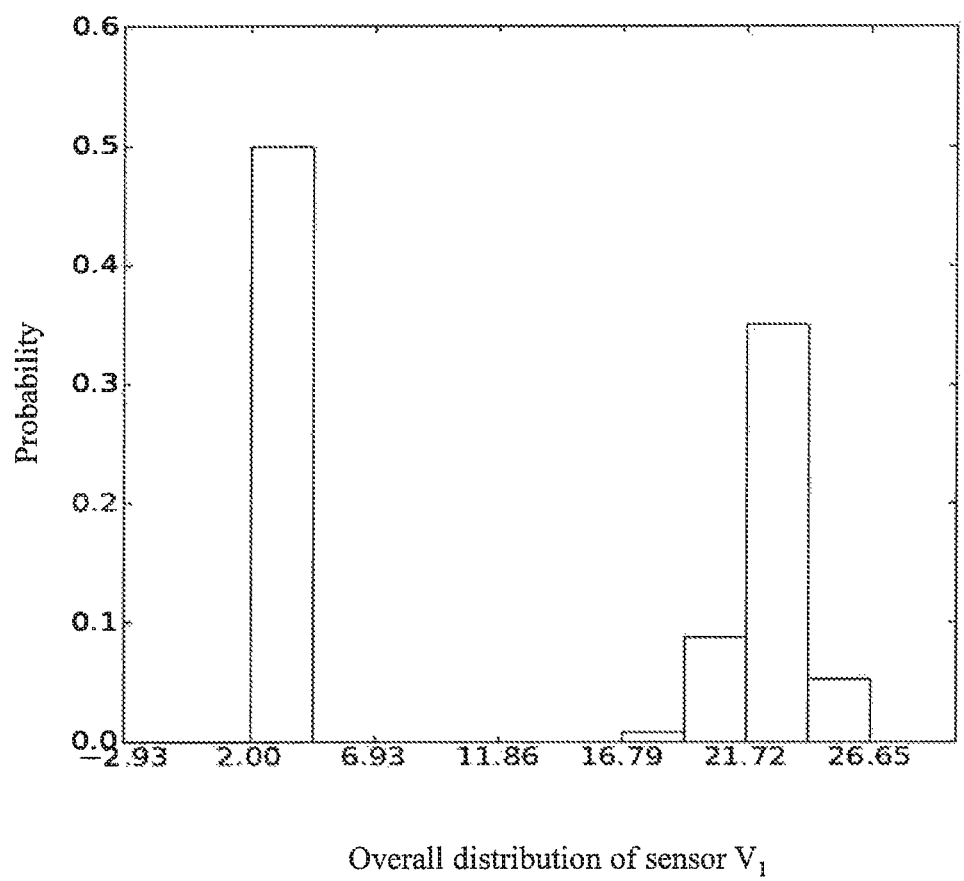
Figure 7G:
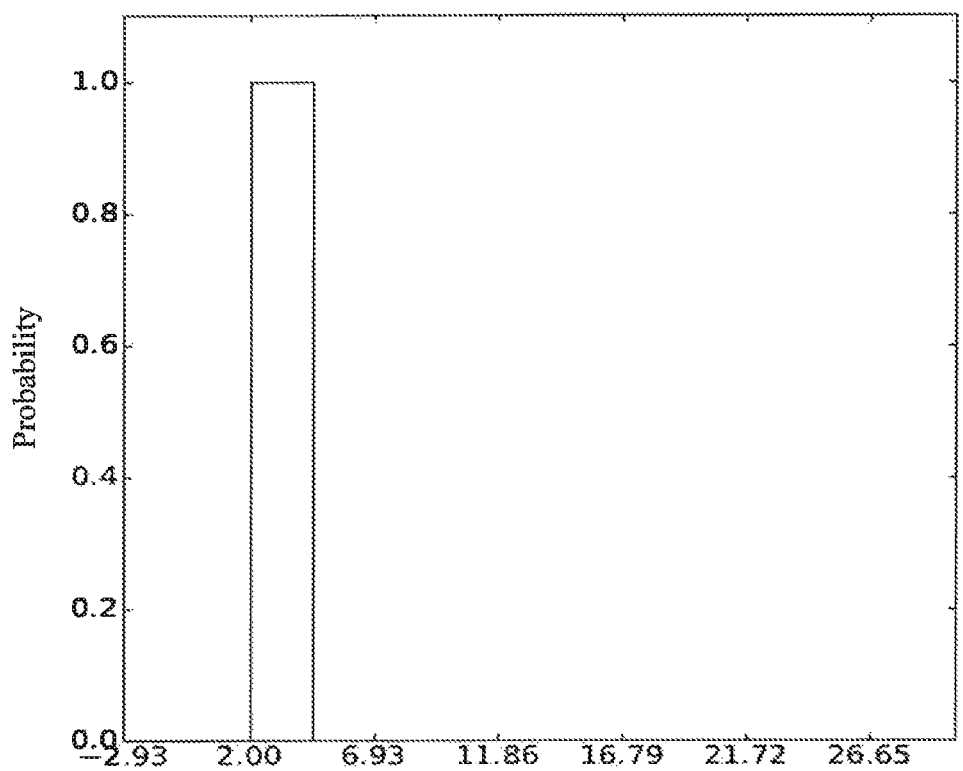
Figure 7H:
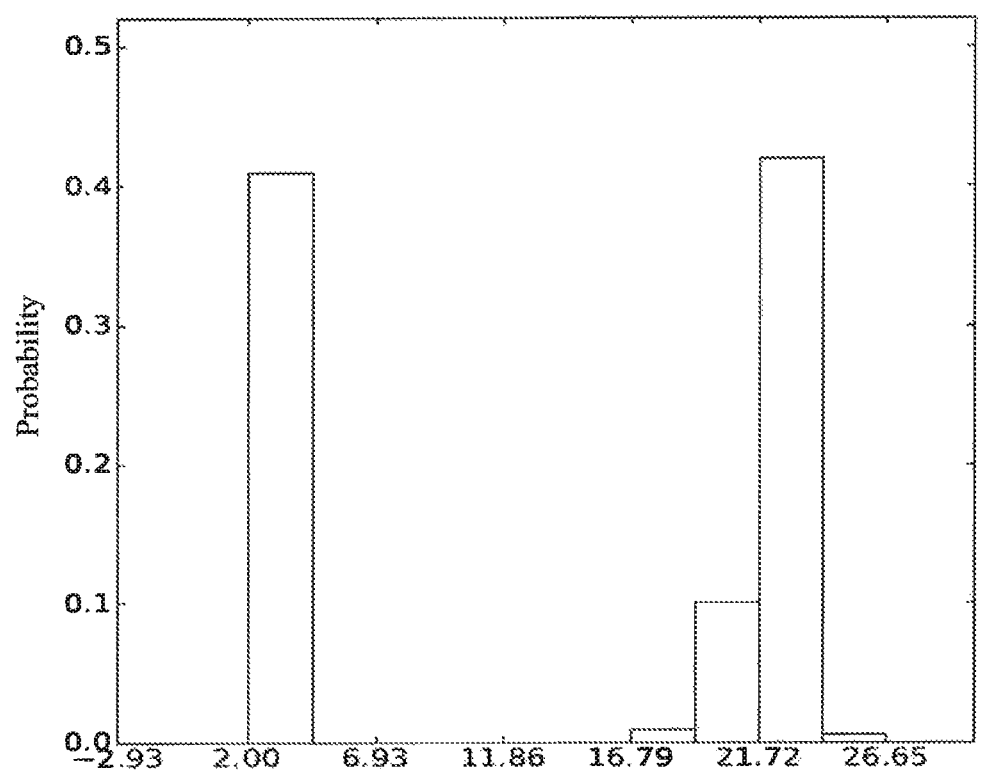

The HI descriptor module 103 uses the BN structure as in FIG. 5a to analyze sensor behavior in regions of low HI. For learning BN, $\omega A$ and $\omega N$ are considered to be of length $\omega=720$, such that at least 70% of points in $\omega A$ have HI below $r'$. To find the most relevant sensor carrying the fault signature, the sensors are ranked from 1 to 58 such that the sensor with highest EI gets rank 1 while sensor with lowest EI gets rank 58. A fault instance is considered to be explained by the HI descriptor module 103, if the most relevant sensor for the fault type gets the highest rank based on EI. Table 2 shows the results for the three fault types where all the instances of Temp-$C_1$ and Temp-$C_2$, and 3 out of 6 vibration related faults could be explained by the highest ranked sensor. For the remaining three instances, it has been found that operating conditions for the faulty window $\omega A$ and the corresponding normal window $\omega N$ were different leading to incorrect explanations. Thus for these cases, the ranks for the most relevant sensor were 2, 6, and 7. These values indicate that distribution of the most relevant sensor changes significantly across the normal and abnormal operating conditions. This change in distribution is captured using EI to find the most relevant sensor. FIGS. 7a and 7b show overall distributions of HI and temperature sensor $T_1$, respectively, for one of the faults related to Temp-$C_1$. FIGS. 7c and 7d show the distributions for sensor $T_1$ under low HI and high HI conditions, respectively. The results for one of the instances of vibration fault are shown in FIGS. 7e-7h.

Example 2: For Engine Dataset

This dataset contains readings from 12 sensors, recorded for 3 years of engine operation. The sensor readings in this dataset are quasi-predictable and depend on an external manual control, namely, Accelerator Pedal Position (APP). LSTM Anomaly Detection (LSTM-AD) based HI Estimation is used for this dataset. All sensors data are input to LSTM-AD such that m=12. Analysis is done for two of the sensors: APP and Coolant Temperature (CT) to get insights into the reasons for estimated low HI. The low HI regions found correspond to three instances of abnormal CT.

Figure 8A:
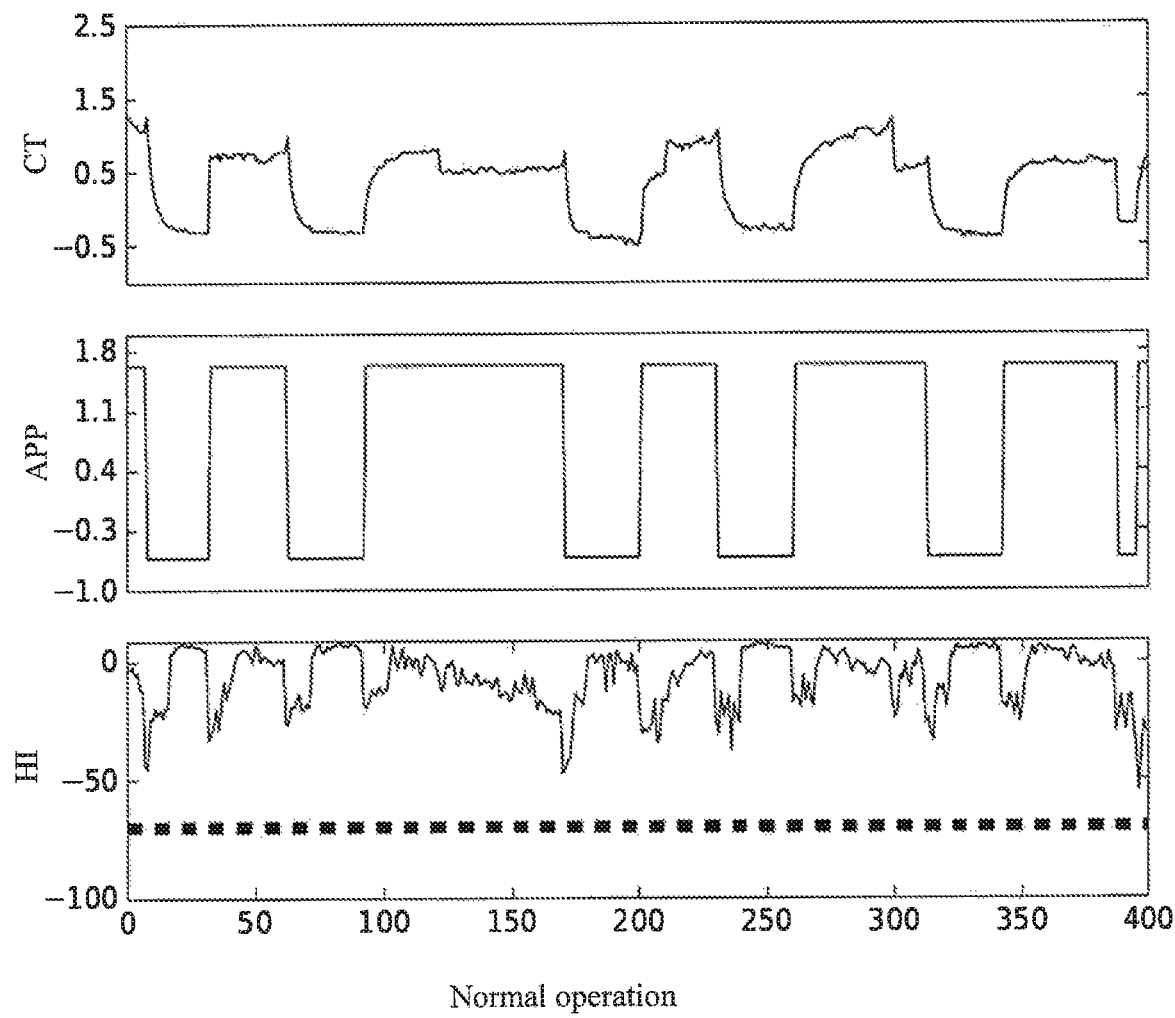
FIGS. 8a, and 8b depict sample HI values estimated for normal operation and abnormal operation of an Accelerator Pedestal Position (APP) and Coolant Temperature (CT) respectively, in accordance with some embodiments of the present disclosure.
Figure 8B:
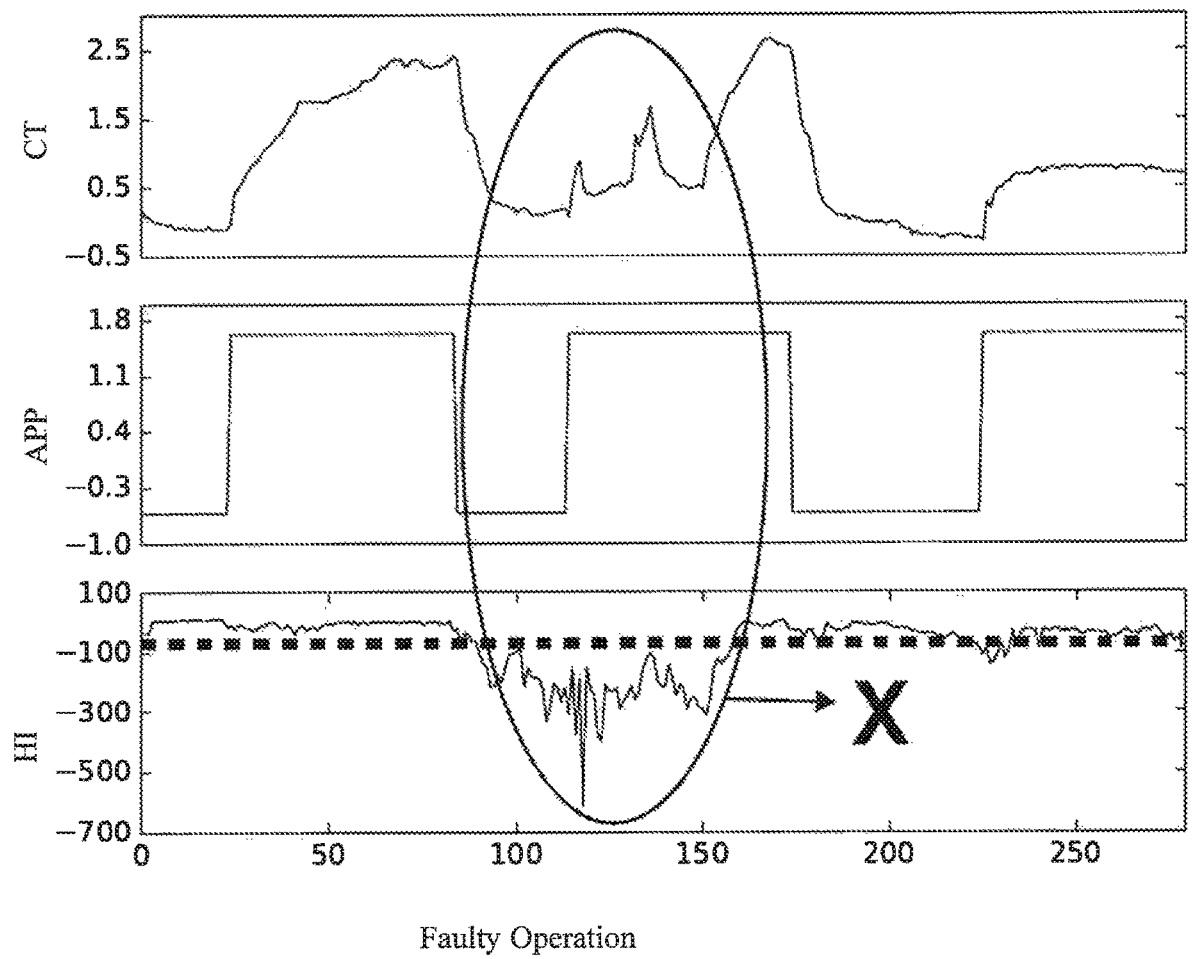

Stage 1: HI Estimation by HI Estimation Module 101:

Table 1 shows the performance of the HI estimation module 101. FIGS. 8a and 8b show the time series plots for CT, APP, and HI for samples of normal and faulty regions in the data, respectively.

Figure 5B:
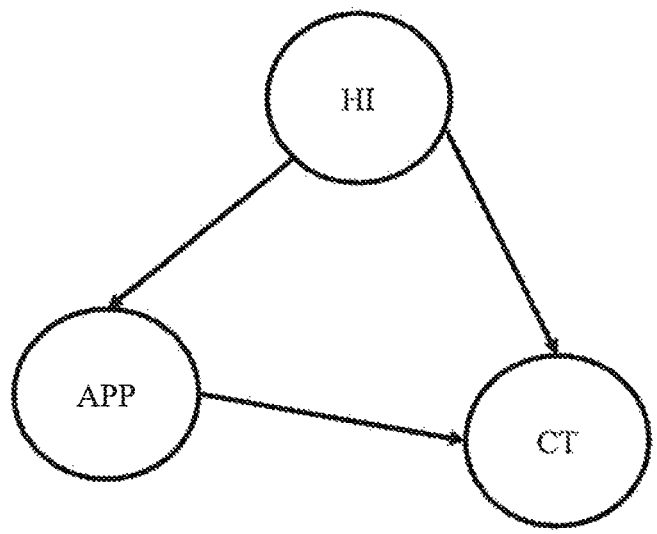

Stage 2: Working of HI Descriptor Module 103 for Identifying Reason for Low HI:

Dependency between HI and sensors is modelled as in FIG. 5b. From domain knowledge, it is known that high APP leads to high CT, while low APP leads to low CT over time with a certain time lag where transient behavior is observed. Any time window over which APP and CT do not exhibit such a temporal correlation is considered faulty (abnormal). Values indicate that when APP is high, CT is also high (marked as A), and when APP is low, CT is low. Further, joint distribution of APP and CT on the low HI regions is conditioned by interactively selecting low HI bars, which indicate that when HI is low, machine is in an abnormal/faulty operation state. The values further indicate that number of points corresponding to healthy state (normal working) decrease and those indicating poor health (abnormal working) increase when HI is low.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is Intended that the disclosure and examples be considered as exemplary only, with a true scope and spirit of disclosed embodiments being indicated by the following claims.

What is claimed is:

1. A processor-implemented method for health monitoring and fault signature identification, comprising:
    estimating Health Index (HI) of a system being monitored, via one or more hardware processors, by a health monitoring and fault signature identification system, wherein the HI is estimated as time-series data for different time intervals;
    identifying abnormal behavior of the system by analyzing one or more low HI windows of the time-series data, via the one or more hardware processors, by the health monitoring and fault signature identification system, wherein an estimated low HI Is identified as indicative of the abnormal behavior, wherein the one or more low HI windows of the time-series data include two or more of HI values below a threshold value; and
    detecting at least one component of the system carrying fault signatures as responsible for the abnormal behavior, based on a local Bayesian Network (BN) generated for the system, via the one or more hardware processors, by the health monitoring and fault signature identification system, wherein the local BN captures dependencies between the estimated HI and fault signatures from the at least one component of the system.

2. The method as claimed in claim 1, wherein the low HI is identified in terms of presence of at least one low HI window in data corresponding to the estimated HI of the system.

3. The method as claimed in claim 1, wherein the HI is estimated using a Recurring Neural network (RNN) that considers a multi-sensor data from the system to be a multi-variate time-series, and training a model based on data from a healthy system to predict the time-series.

4. The method as claimed in claim 1, wherein detecting the at least one component responsible for the abnormal behavior comprises of:
    analyzing the data corresponding to the estimated HI, wherein the data corresponding to the estimated HI is split in different time windows, wherein the time windows include:
    at least one low HI window, wherein a majority of HI values of all HI values of a low HI window are below the threshold value of HI, and
    at least one high HI window, wherein a majority of HI values of all HI values of the high HI window are above the threshold value of HI;
    generating the local BN for the system, based on data from the at least one low HI window, and data from the at least one high HI window;
    generating an Explainability Index (EI) for at least one sensor from which data for the HI estimation is collected, based on the local BN, wherein the EI quantifies effect of the sensor on the HI through a change in distribution of readings that the sensor takes over time between predicted high HI window and the low HI window; and
    identifying dependency between the low HI and the at least one component of the system, based on the EI generated for the at least one sensor.

5. A health monitoring and fault signature identification system, said system comprising:
    a processor; and
    a memory module comprising a plurality of instructions, said plurality of instructions configured to cause the processor to:
    estimate Health Index (HI) of a system being monitored, via one or more hardware processors, by a HI estimation module of the health monitoring and fault detection system, wherein the HI is estimated as time-series data for different time intervals;
    identify abnormal behavior of the system by analyzing one or more low HI windows of the time-series data, via the one or more hardware processors, by a low HI data selection module of the health monitoring and fault detection system, wherein an estimated low HI is identified as indicative of the abnormal behavior, wherein the one or more low HI windows of the time-series data include two or more of HI values below a threshold value; and
    detect at least one component of the system carrying fault signatures as responsible for the abnormal behavior, based on a local Bayesian Network (BN) generated for the system, via the one or more hardware processors, by a HI descriptor module of the health monitoring and fault detection system, wherein the local BN captures dependencies between the estimated HI and fault signatures from the at least one component of the system.

6. The health monitoring and fault detection system as claimed in claim 5, wherein the low HI data selection module is configured to identify the low HI in terms of presence of at least one low HI window in data corresponding to the estimated HI of the system.

7. The health monitoring and fault detection system as claimed in claim 5, wherein the HI estimation module is configured to estimate the HI using a Recurring Neural network (RNN) that considers a multi-sensor data from the system to be a multi-variate time-series, and training a model based on data from a healthy system to predict the time-series.

8. The health monitoring and fault detection system as claimed in claim 5, wherein the HI descriptor module is configured to detect the at least one component responsible for the abnormal behavior by:
    analyzing data corresponding to the estimated HI, wherein the data corresponding to the estimated HI is split in different time windows, wherein the time windows include:
    at least one low HI window, wherein a majority of HI values of all HI values of the low HI window are below the threshold value of HI, and
    at least one high HI window, wherein a majority of HI values of all HI values of the high HI window are above the threshold value of HI;
    generating the local BN for the system, based on data from the at least one low HI window, and data from the at least one high HI window;
    generating an Explainability Index (EI) for at least one sensor from which data for the HI estimation is collected, based on the local BN, wherein the EI quantifies effect of the sensor on the HI through a change in distribution of readings that the sensor takes over time between predicted high HI window and the low HI window; and
    identifying dependency between the low HI data and the at least one component of the system, based on the EI generated for at least one sensor.

9. One or more non-transitory machine readable information storage mediums comprising one or more instructions which when executed by one or more hardware processors causes:
    estimating Health Index (HI) of a system being monitored, via one or more hardware processors, by a health monitoring and fault signature identification system, wherein the HI is estimated as time-series data for different time intervals;
    identifying abnormal behavior of the system by analyzing one or more low HI windows of the time-series data, via the one or more hardware processors, by the health monitoring and fault signature identification system, wherein an estimated low HI is identified as indicative of the abnormal behavior, wherein the one or more low HI windows of the time-series data include two or more of HI values below a threshold value; and
    detecting at least one component of the system carrying fault signatures as responsible for the abnormal behavior, based on a local Bayesian Network (BN) generated for the system, via the one or more hardware processors, by the health monitoring and fault signature identification system, wherein the local BN captures dependencies between the estimated HI and fault signatures from the at least one component of the system.

10. The one or more non-transitory machine readable information storage mediums of claim 9, wherein the low HI is identified in terms of presence of at least one low HI window in data corresponding to the estimated HI of the system.

11. The one or more non-transitory machine readable information storage mediums of claim 9, wherein the HI is estimated using a Recurring Neural network (RNN) that considers a multi-sensor data from the system to be a multi-variate time-series, and training a model based on data from a healthy system to predict the time-series.

12. The one or more non-transitory machine readable information storage mediums of claim 9, wherein detecting the at least one component responsible for the abnormal behavior comprises of:
    analyzing the data corresponding to the estimated HI, wherein the data corresponding to the estimated HI is split in different time windows, wherein the time windows include:
    at least one low HI window, wherein a majority of HI values of all HI values of a low HI window are below the threshold value of HI, and
    at least one high HI window, wherein a majority of HI values of all HI values of the high HI window are above the threshold value of HI;
    generating the local BN for the system, based on data from the at least one low HI window, and data from the at least one high HI window;
    generating an Explainability Index (EI) for at least one sensor from which data for the HI estimation is collected, based on the local BN, wherein the EI quantifies effect of the sensor on the HI through a change in distribution of readings that the sensor takes over time between predicted high HI window and the low HI window; and
    identifying dependency between the low HI and the at least one component of the system, based on the EI generated for the at least one sensor.

* * * * *